United States Patent
Hartley et al.

(10) Patent No.: US 6,661,168 B1
(45) Date of Patent: Dec. 9, 2003

(54) LOW VOLTAGE INCANDESCENT LAMP WITH DUAL ENVELOPE

(75) Inventors: John B. Hartley, Pacific Palisades, CA (US); Muralidhar Theegala, Chino Hills, CA (US); Alexandrina Anghelus, Buena Park, CA (US)

(73) Assignee: Illumination Technology, Inc., Cypress, CA (US)

( * ) Notice: Subject to any disclaimer, the term of this patent is extended or adjusted under 35 U.S.C. 154(b) by 0 days.

(21) Appl. No.: 09/565,624

(22) Filed: May 5, 2000

(51) Int. Cl.$^7$ ................................................ H01J 17/20
(52) U.S. Cl. ........................ 313/573; 313/634; 313/493; 313/17; 313/26
(58) Field of Search ................................ 313/478, 573, 313/17, 493, 580, 579, 636, 25, 26, 315, 317, 323, 324, 623, 634; 362/255, 293

(56) References Cited

U.S. PATENT DOCUMENTS

| | | |
|---|---|---|
| 344,343 A | 6/1886 | Buell |
| 487,479 A | 12/1892 | Frei |
| 512,464 A | 1/1894 | Carey |
| 1,145,837 A | 7/1915 | Hoff |
| 1,194,643 A | 8/1916 | Kreusler |
| 1,858,712 A | 5/1932 | Louttit |
| 2,010,772 A | 8/1935 | Braselton ........................ 176/1 |
| 2,177,755 A | 10/1939 | Uyterhoeven ................ 176/122 |
| 2,735,954 A | 2/1956 | Rawls ......................... 313/216 |
| 3,832,589 A | 8/1974 | Pfaue .......................... 313/217 |
| 3,906,273 A | 9/1975 | Kozlowski ................... 313/220 |
| 4,198,586 A | 4/1980 | de Jong et al. .............. 313/220 |
| 5,091,674 A | 2/1992 | Zimlich et al. .............. 313/625 |
| 5,453,655 A | 9/1995 | Helbig et al. ................. 313/25 |
| 5,466,981 A | 11/1995 | Fields et al. ................. 313/113 |
| 5,600,198 A | 2/1997 | Meade et al. ........... 313/318.01 |
| 5,686,786 A | 11/1997 | Lang et al. .................. 313/478 |

FOREIGN PATENT DOCUMENTS

WO    WO9627896    9/1996

OTHER PUBLICATIONS

*Patent Abstracts of Japan*, vol. 014, No. 112 (E–0897) Feb. 28, 1990 & JP 01 311537A—Dec. 15, 1989 (abstract).
*Patent Abstracts of Japan*, vol. 014, No. 292 (E–0944), Jun. 25, 1990 & JP 02 094350A—Apr. 5, 1990 (abstract).
*Database WPI—Derwent Publications, Ltd., London, GB: AN 1991–338410 XP002177971 & SU 1 617 487 A (EREV ELEC BULB WKS)*, Dec. 30, 1990 abstract.

*Primary Examiner*—Vip Patel
*Assistant Examiner*—Joseph Williams
(74) *Attorney, Agent, or Firm*—Gabor L. Szekeres

(57) ABSTRACT

A miniature or subminiature incandescent lamp designed to operate with an energy source of 20 volts or less includes a filament enclosed in a first glass envelope and supported by a pair of metal contact pins. A first glass bead seals the envelope and has a pair of openings through which the metal contact pins penetrate and wherein they are hermetically sealed. A second glass bead of low melting solder glass is larger than the first bead and is sealed below the first bead and extends circumferentially beyond the perimeter of the first bead. A third bead of high melting glass is disposed below the second bead also in sealing relationship with the second bead. The outside perimeter of the third bead is substantially co-extensive with that of the second bead. A second glass envelope is sealed to the outside perimeter of the second bead and is also in abutting relationship with the third bead. The interior of the first envelope is evacuated or contains an inert gas of the type normally used in incandescent lamps. The interior hermetically sealed space between the first and second envelopes is also evacuated, filled with an inert gas or with nitrogen. The resulting miniature and subminiature lamps have operating exterior surface temperatures which do not exceed 160° C.

22 Claims, 4 Drawing Sheets

LOW VOLTAGE INCANDESCENT LAMP WITH DUAL ENVELOPE

BACKGROUND OF THE INVENTION

1. Field of the Invention

The present invention is in the field of incandescent lamps. More particularly, the present invention is directed to incandescent lamps which have two envelopes so as to reduce the exterior surface temperature of the lamp when it is in operation. Still more specifically, the present invention is directed to miniature and subminiature incandescent lamps that operate on low voltage.

2. Brief Description of the Prior Art

Incandescent lamps which have two envelopes are known in the art, and are described for example in U.S. Pat. Nos. 344,343; 512,464; 1,145,837; 1,194,643; 1,858,712; 2,010,772 and 2,177,755. Similar or related structures, such as metal vapor discharge lamps and and two-electrode spark gap apparatus having two envelopes or the like are described in U.S. Pat. Nos. 5,600,198; 5,453,655; 4,198,586; 3,906,273; 3,832,589 and 2,735,954.

U.S. Pat. No. 5,686,786 discloses an incandescent lamp that is suitable for use in conjunction with night vision equipment when the specialized glass envelope of the lamp is not transparent to light of certain wave length. The general structure described in this patent is also well suited for the manufacture of sub-miniature and miniature lamps without necessarily having the specialized glass envelope required for compatibility with night vision equipment.

As is known in the art, and stated in one more of the above-cited prior art patents (e.g. U.S. Pat. Nos. 344,343 and 1,145,837) the use of a second glass envelope enclosing the first envelope that contains the incandescent filament results, generally speaking, in lower temperature of the exterior surface of the second envelope than what the temperature of the exterior surface of the first envelope would be without further thermal insulation provided by the second envelope. In other words, as is known in the art, the second envelope results in lamp that is cooler on the outside than a comparable lamp would be without the second envelope.

Providing relatively cool exterior surface to incandescent lamps has particular importance in certain applications, such as in certain types of flashlights, lights used in hazardous situations or environments, in portable lanterns and in area spot and floodlights. In fact, there are Underwriter Laboratories standards for incandescent lamps used in certain applications where the standards require the outside surface temperature of the lamp not to exceded 160° C. (the permissible maximum under the standard). In order to meet this Underwriter Laboratories standard the power output of certain incandescent lamps must be limited beyond that which would be otherwise desirable, because, as it is well understood in the art, greater power output results in brighter lamp, but also tends to increase the surface temperature of the lamp. The present invention is designed to accommodate the need for lamps with surface temperatures that are relatively cool (in case of miniature and sub-miniature lamps do not exceed 160°) and provides an incandescent lamp having two envelopes (resulting in said lower exterior surface temperatures) which are easily and relatively inexpensively manufactured using existing prior art lamps.

SUMMARY OF THE INVENTION

It is an object of the present invention to provide an incandescent lamp that has relatively cool exterior surface temperature.

It is another object of the present invention to provide an incandescent lamp construction that is well suited for the manufacture of miniature and subminiature lamps which have relatively cool exterior surface temperature that does not exceed 160° C.

It is still another object of the present invention to provide an incandescent lamp that meets the foregoing objects and is readily manufactured from existing fully assembled incandescent lamps of a certain construction, generally described in U.S. Pat. No. 5,686,786.

The foregoing and other objects and advantages are attained by an incandescent lamp that includes a filament enclosed in a first glass envelope and supported by a pair of metal contact pins. A first glass bead seals the envelope and has a pair of openings through which the metal contact pins extend and wherein they are hermetically sealed. The first envelope, the filament, the supporting metal contact pins and the first glass bead together form a prior art incandescent lamp similar to the type disclosed in U.S. Pat. No. 5,856,786; that is these parts when assembled would form the aforesaid prior art lamp if they were not made to be part of the overall structure of the present invention. A second glass bead of low melting solder glass is larger than the first bead and is sealed below the first bead and extends circumferentially beyond the perimeter of the first bead, and a third bead is disposed below the second bead also in sealing relationship with the second bead. The metal contact pins extend through the second and third glass beads to serve as electric contacts when the lamp is to be energized. The outside perimeter of the third bead is substantially co-extensive with that of the second bead. A second glass envelope is sealed to the outside perimeter of the second bead and is also in abutting relationship with the third bead. The interior of the first envelope is evacuated or contains an inert gas of the type normally used in incandescent lamps. The interior hermetically sealed space between the first and second envelopes is also evacuated, or filled with an inert gas, but is preferably filled with nitrogen gas. The resulting miniature and sub-miniature lamps have operating exterior surface temperatures which do not exceed 160° C.

The features of the present invention can be best understood together with further objects and advantages by reference to the following description, taken in connection with the accompanying drawings, wherein like numerals indicate like parts.

DESCRIPTION OF THE PREFERRED EMBODIMENT

The following specification taken in conjunction with the drawings sets forth the preferred embodiment of the present invention. The embodiment of the invention disclosed herein is the best modes contemplated by the inventors for carrying out their invention in a commercial environment, although it should be understood that various modifications can be accomplished within the parameters of the present invention.

It should be understood at the outset of the present description that the invention is primarily concerned with providing lamps for use in flashlights, portable lights, lights to be used in hazardous applications and environments where it is important for the exterior surface of the lamp to be relatively cool, and specifically to meet the Underwriter Laboratories' standard that requires the exterior temperature not to exceed 160° C. The incandescent lamps of lights of this type usually are miniature and subminiature incandescent lamps. Therefore, although the generic principles disclosed herein are not limited to miniature and subminiature incandescent lamps, the preferred embodiment is a miniature lamp, and the invention is primarily described in connection with the structure and manufacture of miniature and subminiature incandescent lamps. Moreover, incandescent lamps in accordance with the present invention preferably operate on twenty volts (20V) or less, and even more preferably on ten volts (10V) or less.

Figure 1:
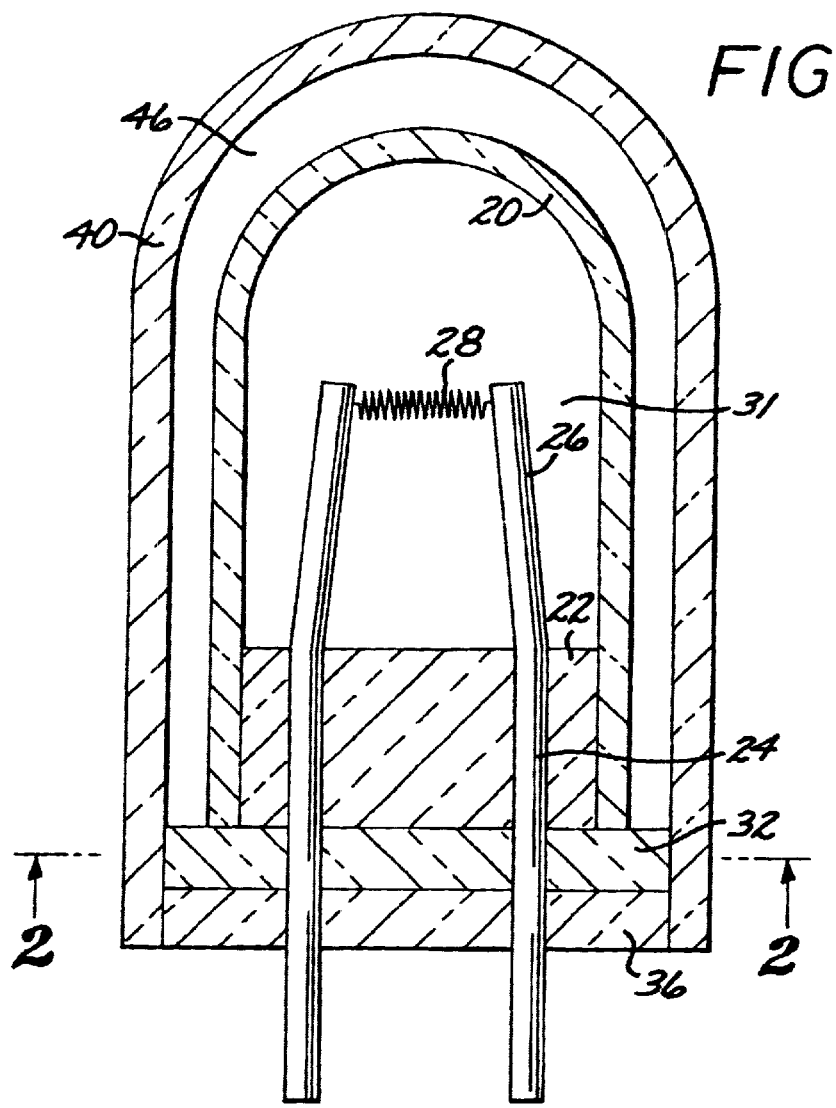
FIG. 1 is a cross-sectional view of a miniature incandescent lamp that is the preferred embodiment of the present invention.
Figure 2:
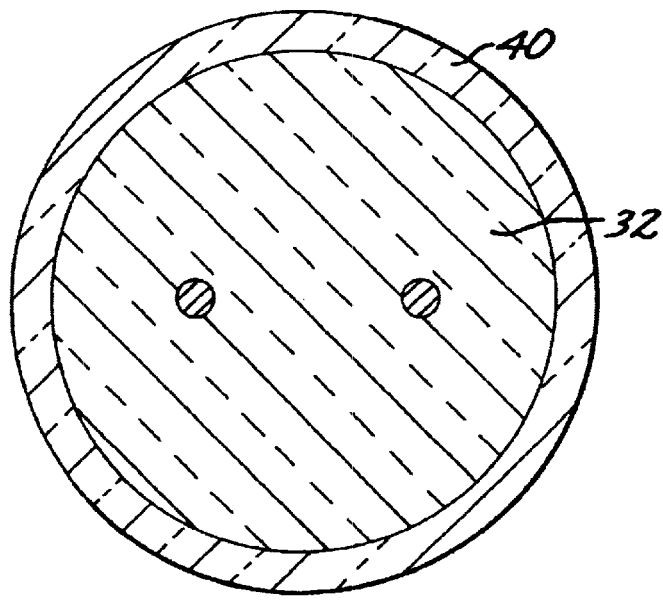
FIG. 2 is a cross-sectional view taken on lines 2, 2 of FIG. 1.
Figure 3:
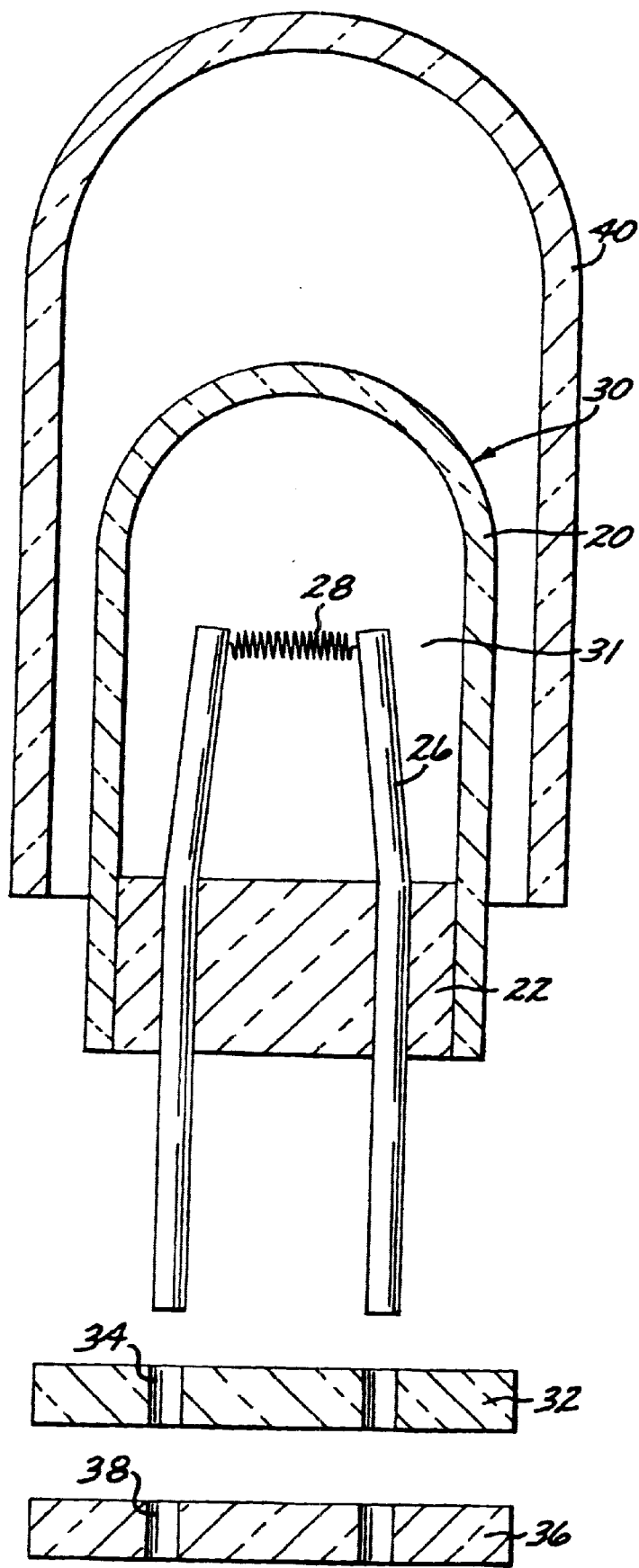
FIG. 3 is a partially exploded cross-sectional view of the preferred embodiment.
Figure 4:
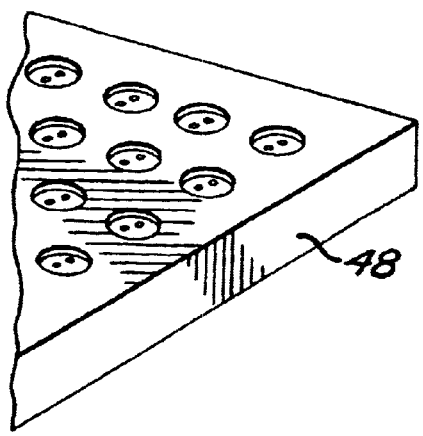
FIG. 4 is a schematic, partial perspective view of a graphite heating plate or tool which is used in the manufacture of the preferred embodiment.
Figure 5:
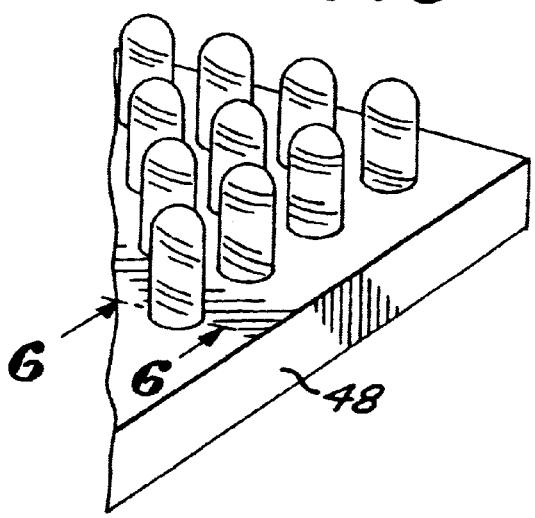
FIG. 5 is a schematic, partial perspective view of a step in the manufacture of the preferred embodiment.
Figure 6:
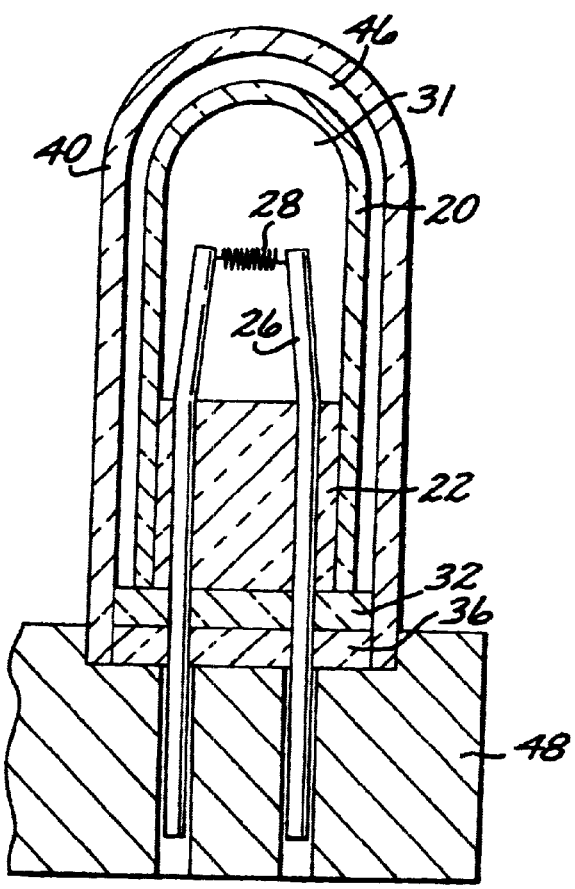
FIG. 6 is an enlarged schematic cross-sectional view taken on lines 6,6 of FIG. 5.
Figure 7:
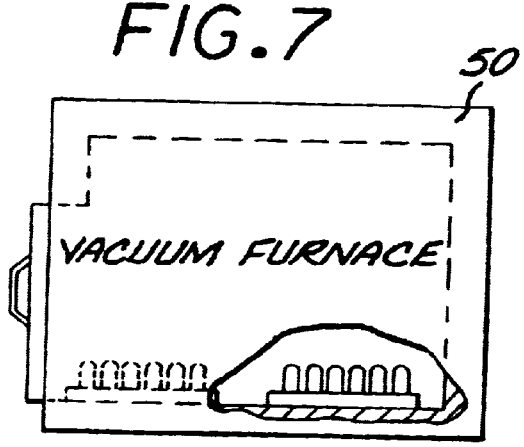
FIG. 7 is a schematic view showing another step in the process of manufacturing the preferred embodiment.

Referring now to the drawing figures, and particularly to the cross-sectional view of FIG. 1 and to the partially exploded cross-sectional view of FIG. 3, the presently preferred embodiment of the present invention is disclosed. The preferred embodiment is a miniature or subminiature lamp including a first glass envelope 20 of a generally cylindrical configuration, although it should be understood that other configurations or shapes are also possible and within the scope of the invention. The first glass envelope 20 is sealed at the bottom with glass-to-glass seals with a first glass bead 22. The first glass bead 22 includes two parallel spaced openings or holes 24 into which filament support and current supply wires or pins 26 are sealed with glass to metal seals. A tungsten filament 28 of the type which is normally used in incandescent lamps and particularly in miniature or subminiature incandescent lamps, is positioned between the current supply wires or pins 26. The first glass envelope 20 is of a glass which is characterized in the trade as "high melting glass", that is glass melting at 600° C. or higher temperature, usually within the range of 600 to 800°. The first glass envelope 20 is glass which is transparent to light. Soda lime glass fits these requirements and in the herein described preferred embodiment the first envelope 20 is made from glass that is obtainable from Schatt under the designation AR-Glas. The first glass bead 22 also consists of high melting glass, however this part does not need to be transparent to light, and is preferably opaque. A glass characterized as "ELAN#13" obtainable from Accu-Glass, fits these requirements and is used in the presently preferred embodiment. The current supply wires or pins 26 may comprise several materials known in the art and suitable for this purpose. Suitability in this regard includes the requirement for a thermal expansion coefficient that is substantially the same as that of the glass bead 22 into which the pins 26 are embedded by glass-to-metal seals. A suitable material for this purpose is DUMET® which is an alloy having a nickel-iron core and a copper sheath. The tungsten filament 28 is attached to the pins 26 by a technique known as "staking", that is by pushing the harder tungsten material of the filament 28 into the softer metal of the pins 26. In the preferred embodiment the pins 26 are made of borated DUMET® wire obtainable from CIT.

The above-described structure formed of the first glass envelope 20, first glass bead 22, pins 26 and tungsten filament 28 is assembled substantially in accordance with the teaching of U.S. Pat. No. 5,686,786, the specification of which is incorporated herein by reference. This structure as assembled is shown in FIG. 3 as the non-exploded part having the reference numeral 30. The interior space 31 of the first envelope 20 that is sealed with the first glass bead 22 may be evacuated to contain as perfect vacuum as customary in the incandescent lamp manufacturing arts, or the space 31 may contain an inert gas (such as argon or xenon) of the type normally used in the incandescent lamp manufacturing arts. In the herein described preferred embodiment the interior space contains xenon gas. As it will be recognized by those skilled in the art, the structure identified with the reference numeral 30 in FIG. 3 can serve as a functioning incandescent lamp. In fact, the herein described preferred embodiment of the invention utilizes the incandescent lamp 30 as a component on the manufacturing of the lamp of the invention. For details of the process of manufacturing the lamp 30 reference is made to the specification of the above-noted U.S. Pat. No. 5,686,786. Briefly summarized, this manufacturing operation involves first the assembly of the filament 28 to the pins 26 to create a filament-to-pin subassembly (not specifically shown as such). Thereafter, the filament-to-pin subassembly is mounted to the remaining components (envelope 20 and bead 22) and high-temperature-glass to high-temperature-glass and high temperature-glass to metal seals are created in a vacuum furnace, wherein xenon (or other inert) gas is introduced in the final steps to provide the xenon gas atmosphere in the interior space 31.

Referring still primarily to FIGS. 1 and 3 of the appended drawings, the incandescent lamp of the present invention includes a second glass bead 32 which has a larger area than the first glass bead 22. In the preferred embodiment both glass beads 22 and 32 are of a disc like configuration, and the second glass bead 32 has larger diameter than the first glass bead 22. Apertures or holes 34 are provided in the second glass bead 32 to accommodate the pins 26. It is an important feature of the present invention that the second glass bead 32 is made of a glass generally known in the art as solder glass. This type of glass is a "low melting" glass which melts in the approximate temperature range of 375 to 600° C. A well known characteristic of solder glass is that it is capable of forming hermetic seals with high temperature glass and also with metal when it is heated to a temperature that is low enough not to melt the high melting soda lime or other high melting glass. The glass of the second bead 32 of the herein described preferred embodiment is obtainable from Accu-Glass under the designation G017-340.

A third glass bead 36 is located below the second glass bead 32. The third glass bead 36 of the preferred embodiment is also of a generally disc like configuration and has the same diameter as the second glass bead 32. The third glass bead 36 is high melting glass. In the herein described preferred embodiment it comprises the same opaque high melting glass as the first bead 22. The third glass bead 36 also has apertures or holes 38 to accommodate the pins 26. The apertures 38 of the third glass bead 36 are shown in the exploded cross-sectional view of FIG. 3.

Figure 8:
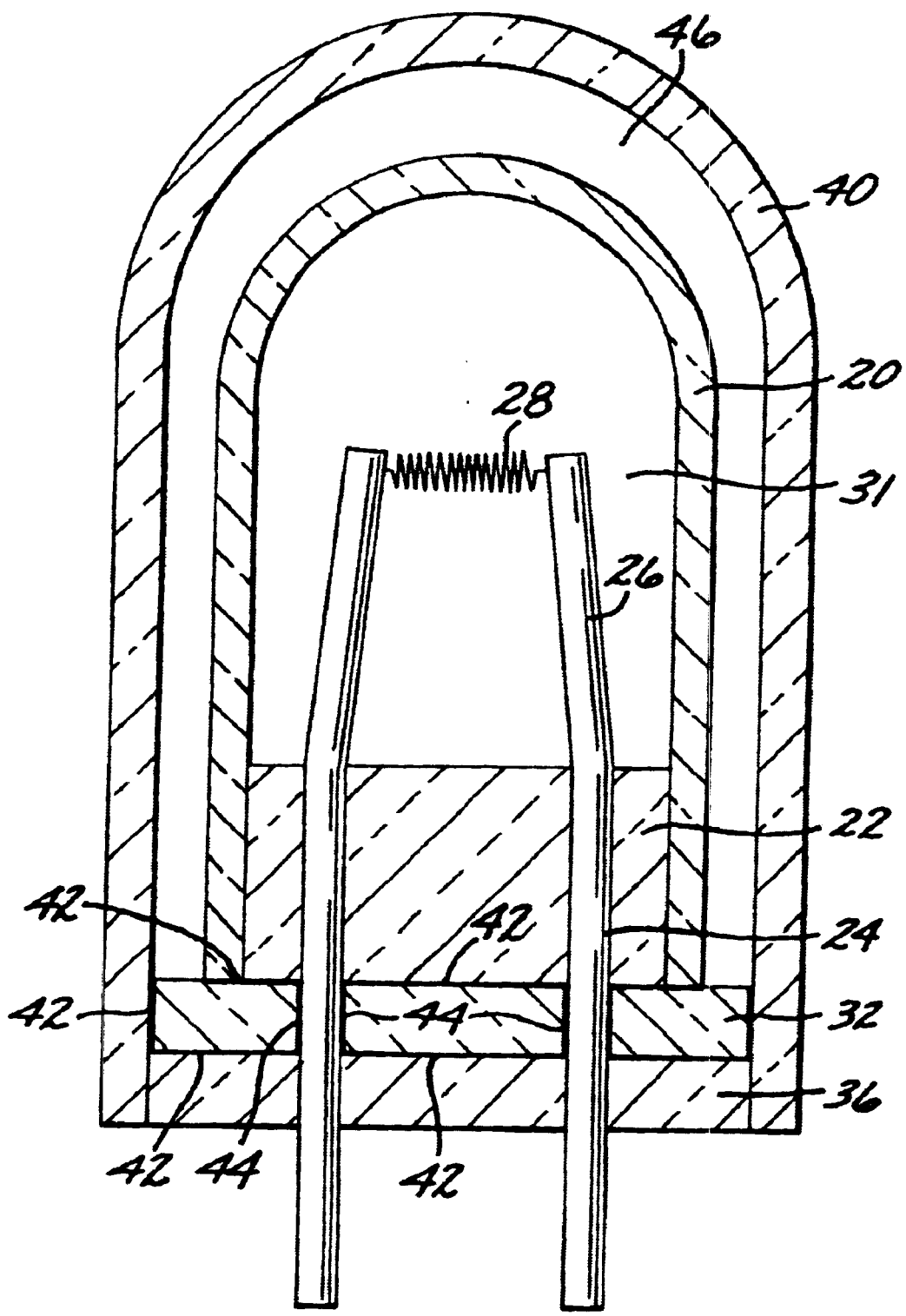
FIG. 8 is a cross-sectional view of the preferred embodiment, similar to the view of FIG. 1, and showing seals between a low melting glass and high melting glass and between low melting glass and metal contact pins.

When the second and third glass beads 32 and 36 are assembled or mounted below the first glass bead 22, as shown in FIG. 3, with the respective holes accommodating the current supply wires or pins 26, the two beads 32 and 36 form a periphery to which a second glass envelope 40 is mounted. The second glass envelope 40 is made of high melting transparent glass, such as soda lime glass which may be the same as the glass of the first envelope 20. Referring now primarily to FIG. 8 of the appended drawings, low-melting glass to high-melting glass seals 42 and low melting glass to metal seals 44 are shown, which are formed when the assembled apparatus is subjected to heat in a vacuum furnace. These seals 42 and 44 keep the components of the incandescent lamp of the present invention together and provide a hermetic seal for the space 46 between the two envelopes 20 and 40. Nevertheless, as it can be readily seen from the drawing figures the low melting glass to metal seals 44 are not even necessary to create the hermetically sealed spaces 31 and 46. The space 46 in accordance with the present invention may be evacuated to "contain" vacuum, or it may contain nitrogen or an inert gas, such as neon, xenon or argon. In the herein described preferred embodiment the space 46 between the two envelopes 20 and 40 contains nitrogen gas.

FIGS. 4–7 illustrate the process of manufacturing the preferred embodiment of the incandescent lamp of the invention from the components described above. Thus, the single-envelope-lamp assembly 30, the second and third glass beads 32 and 36 and the second envelope 40 are assembled to one another in a graphite boat 48 that serves as a jig and also as a heating element, similarly to its use described in the above-mentioned U.S. Pat. No. 5,686,786. The graphite boat 48 accommodates a plurality of, preferably several hundreds of the assembled lamps, in the manner shown in FIGS. 6 and 7. The charged graphite boat 48 is then placed into a vacuum furnace 50 (schematically shown in FIG. 7) of the type which is known and used in the art for sealing components of incandescent lamps. Evacuation, charging and again evacuating gases from the vacuum furnace 50 is conducted under the control of a computer (not shown) in the manner known in the art. The process of creating the low-melting glass to high-melting glass seals 42 and low melting glass to metal seals 44 is conducted exposing the assembled components to heat which is sufficient to soften the solder glass of the second bead 32 but is not high enough to adversely affect the high melting glass. This heat or temperature is in the 400 to 600° C. range. Preferably, as in the herein described preferred embodiment, the assembly is kept in the vacuum furnace 50 at approximately 500° C for approximately 20 minutes. During this process nitrogen gas is introduced into the furnace 50, to provide the nitrogen atmosphere that exists in the lamp of the invention in the space 46 between the two glass envelopes 20 and 40. The requisite heat is generated by passing current through the graphite boat 48.

The third glass bead 36 of high melting glass serves in this process to separate the low melting bead 32 from contact with the graphite boat 48. Without this separation the low melting bead 32 of solder glass would adhere to the graphite boat 48.

Actual dimensions of a exemplary preferred lamp of the invention are as follows. The overall diameter of the lamp (outside diameter of the cylinder shaped second envelope 40) is 0.394 " (10.01 mm). The overall length (height) of the lamp (not counting the downwardly protruding pins 26) is 0.850 " (21.59 mm). The second bead 32 and the third bead 36 both are 0.050 "(1.27 mm) thick. The second and third beads 32 and 36 each have a diameter of 0.362 " (9.19 mm). The pins 26 are located in holes the center of which are 0.158 " (4.01 mm) apart. The wall of the second envelope 40 is 0.032 " (0.81 mm) thick. The first glass bead 20 has a diameter of 0.283 (7.19 mm), a length of 0.675 " (17.15 mm) and a wall thickness of 0.018" (0.45 mm). The filament 28 has the following characteristics: it is approximately 0.653" (16.33 mm) long in uncoiled configuration, and has a diameter of 64.6 microns. This exemplary lamp of the invention is designed to be operated by 4.8 V source of electric power, and at that voltage is designed to draw approximately 1.1 A of current. Another exemplary lamp of the invention is designed to be operated at 3.7 V and draws approximately 0.9 A current at that voltage.

A principal advantage of the dual envelope incandescent lamps of the present invention is that the operating surface temperature is significantly lower than what a comparable lamp would be with only one glass envelope. For example, the above noted exemplary lamps, operating at 4.8 V and 3.7 V, respectively, each have an outside surface temperature of approximately 140–145°. This is well below the 160° C. not-to-exceed limit set by the Underwriter Laboratories for lamps to be used in certain applications. Comparable prior art lamps operating at the same voltage and power output are likely to have exterior surface temperatures approximating or even exceeding 200° C.

Another significant advantage of the dual incandescent lamps of the present invention is that they are relatively easy and relatively economical to manufacture using as a component a prior-art lamp which is itself relatively economically manufactured.

It should be understood that while the preferred embodiments of the invention have been shown and described, modifications may be become readily apparent to those skilled in the art in light of the foregoing disclosure. Therefore, the scope of the present invention should be interpreted solely from the following claims, as such claims are read in light of the disclosure.

What is claimed is:

1. An incandescent lamp comprising:

a first transparent glass envelope of high melting glass;

a filament mounted within the interior of the first glass envelope;

a pair of metal contact pins supporting and in electrical contact with the filament;

a first glass member of high melting glass hermetically sealing the first glass envelope thereby creating a first enclosed space;

a second glass member of low melting solder glass sealed below the first glass member;

third glass member of high melting glass sealed below the second glass member, the third glass member forming the bottom of the lamp, and a second transparent glass envelope of high melting glass hermetically sealed to the second glass member enclosing the first transparent envelope and creating a hermetically sealed second enclosed space between the first and second transparent envelopes, the metal contact pins penetrating through the first, second and third glass members and being hermetically sealed in the first glass member, the pins extending from the third glass member whereby the lamp can be energized by contacting the pins with a voltage source, the sealed space between between the first and second transparent envelopes acting as a heat insulator when the lamp is energized.

2. An incandescent lamp in accordance with claim 1 wherein the first and second glass envelopes are of a cylindrical configuration.

3. An incandescent lamp in accordance with claim 1 wherein the first enclosed space includes an inert gas atmosphere.

4. An incandescent lamp in accordance with claim 1 wherein the second enclosed space includes a nitrogen atmosphere.

5. An incandescent lamp in accordance with claim 1 wherein the first enclosed space includes an inert gas atmosphere and wherein the second enclosed space includes a nitrogen atmosphere.

6. An incandescent lamp in accordance with claim 1 designed to operate with an energy source of 20 volts or less.

7. An incandescent lamp in accordance with claim 6 designed to operate with an energy source of 10 volts or less.

8. An incandescent lamp in accordance with claim 1 wherein the second glass member is made of glass that melts within the range of 375 to 600° C.

9. An incandescent lamp comprising:
   a first transparent glass envelope of high melting glass and of substantially cylindrical configuration;
   a filament mounted within the interior of the first glass envelope;
   a pair of metal contact pins supporting and in electrical contact with the filament;
   a first glass bead of high melting glass hermetically sealing the first glass envelope thereby creating a first enclosed space;
   a second glass bead of low melting solder glass sealed below the first glass bead;
   third glass bead of high melting glass sealed below the second glass bead, the third glass bead forming the bottom of the lamp, and
   a second transparent glass envelope of high melting glass of substantially cylindrical configuration hermetically sealed to the second glass bead enclosing the first transparent envelope and creating a hermetically sealed second enclosed space between the first and second transparent envelopes, the metal contact pins penetrating through the first, second and third glass beads and being hermetically sealed in the first glass bead, the pins extending from the third glass bead whereby the lamp can be energized by contacting the pins with a voltage source, the sealed space between between the first and second transparent envelopes acting as a heat insulator when the lamp is energized.

10. An incandescent lamp in accordance with claim 9 wherein the first, second and third glass beads are disc shaped, each having cylindrical curved exterior periphery, the first, second and third glass beads are concentrically aligned with one another and wherein the second and third beads have larger diameter than the first glass bead.

11. An incandescent lamp in accordance with claim 9 wherein the second glass envelope abuts and is sealed to the cylindrical exterior periphery of the second glass bead.

12. An incandescent lamp in accordance with claim 9 wherein the second glass envelope abuts the cylindrical exterior periphery of the third glass bead.

13. An incandescent lamp in accordance with claim 9 wherein the first, second and third glass beads are disc shaped, each having cylindrical curved exterior periphery, the first, second and third glass beads are concentrically aligned with one another and wherein the second and third beads have larger diameter than the first glass bead, the second glass envelope abuts the cylindrical exterior peripheries of the second and third glass beads and is sealed to the second glass bead.

14. An incandescent lamp in accordance with claim 13 wherein the second glass member is made of glass that melts within the range of 375 to 600° C.

15. An incandescent lamp in accordance with claim 9 designed to operate with an energy source of 20 volts or less.

16. An incandescent lamp in accordance with claim 15 designed to operate with an energy source of 10 volts or less.

17. An incandescent lamp in accordance with claim 9 wherein the first enclosed space has an inert gas atmosphere.

18. An incandescent lamp in accordance with claim 9 wherein the second enclosed space has a nitrogen gas atmosphere.

19. A miniature or subminiature incandescent lamp, designed to operate with an energy source of less than 20 volts, comprising:
   a first transparent glass envelope of high melting glass and of substantially cylindrical configuration;
   a filament mounted within the interior of the first glass envelope;
   a pair of metal contact pins supporting and in electrical contact with the filament;
   a first glass bead of high melting glass hermetically sealing the first glass envelope thereby creating a first enclosed space;
   a second substantially disc shaped glass bead of low melting solder glass positioned concentrically below and sealed below the first glass bead;
   third substantially disc shaped glass bead of high melting glass positioned concentrically below and sealed below the second glass bead, the third glass bead forming the bottom of the lamp, and
   a second transparent glass envelope of high melting glass hermetically sealed to the second glass bead enclosing the first transparent envelope and creating a hermetically sealed second enclosed space between the first and second transparent envelopes, the metal contact pins penetrating through the first, second and third glass beads and being hermetically sealed in the first glass bead, the pins extending from the third glass bead whereby the lamp can be energized by contacting the pins with a voltage source, the sealed space between between the first and second transparent envelopes acting as a heat insulator when the lamp is energized.

20. An incandescent lamp in accordance with claim 19 wherein the first enclosed space has an inert gas atmosphere.

21. An incandescent lamp in accordance with claim 20 wherein the second enclosed space has a nitrogen gas atmosphere.

22. An incandescent lamp in accordance with claim 21 designed to operate with an energy source of 10 volts or less.

* * * * *